United States Patent [19]

Brummel

[11] Patent Number: 4,617,742
[45] Date of Patent: Oct. 21, 1986

[54] HEAT TREAT APPARATUS

[75] Inventor: Roger L. Brummel, South Lyon, Mich.

[73] Assignee: Fluidtherm Corporation, South Lyon, Mich.

[21] Appl. No.: 713,864

[22] Filed: Mar. 20, 1985

Related U.S. Application Data

[63] Continuation-in-part of Ser. No. 574,891, Jan. 30, 1984, abandoned.

[51] Int. Cl.⁴ .............................................. F26B 17/10
[52] U.S. Cl. ........................................ 34/57 A; 34/10; 432/58; 239/553.3; 239/553.5; 239/568; 239/600; 266/251; 148/20.3
[58] Field of Search ........................ 34/57 A, 57 R, 10; 432/58, 15; 239/553.3, 553.5, 590.3, 590.5, DIG. 23, 568, 600, 601, DIG. 1; 148/16, 20.3; 266/249, 250, 251, 257, 259; 29/163.5 R, 163.5 F

[56] References Cited

U.S. PATENT DOCUMENTS

| | | | |
|---|---|---|---|
| 1,839,284 | 1/1932 | White | 29/163.5 R |
| 2,463,239 | 3/1949 | Bowman et al. | 29/163.5 R |
| 2,651,565 | 9/1953 | Bergman | 34/57 A |
| 2,781,097 | 2/1957 | Nold | 29/163.5 R |
| 3,197,346 | 7/1965 | Munday | 148/13.1 |
| 3,233,739 | 2/1966 | Zievers et al. | 29/163.5 R |
| 3,298,793 | 1/1967 | Mallison et al. | 34/57 A |
| 3,672,577 | 6/1972 | Kramer | 34/57 A |
| 3,821,342 | 6/1974 | Huro | 432/58 |
| 3,892,044 | 7/1975 | Kayatz | 34/20 |
| 3,973,642 | 8/1976 | Dahlquist | 239/590.3 |
| 4,090,852 | 5/1978 | Dowd | 34/57 A |
| 4,257,171 | 3/1981 | Johnson et al. | 34/57 A |
| 4,340,433 | 7/1982 | Harding | 148/16 |
| 4,379,725 | 4/1983 | Kemp | 148/4 |
| 4,410,373 | 10/1983 | Kemp | 148/16 |
| 4,461,656 | 7/1984 | Ross | 148/16 |

FOREIGN PATENT DOCUMENTS 1558969  1/1980  United Kingdom ............... 266/251

Primary Examiner—Albert J. Makay
Assistant Examiner—David W. Westphal
Attorney, Agent, or Firm—Charles W. Chandler

[57] ABSTRACT

Heat treating apparatus in which a diffuser mounted beneath a bed of sand in a heating chamber passes gas through the sand to fluidize it. In one form of the invention, the gas rises through slits coined in a metal plate that supports the sand. In another embodiment of the invention, the gas rises through ceramic fiber mesh which uniformly fluidizes the sand.

6 Claims, 7 Drawing Figures

HEAT TREAT APPARATUS

CROSS REFERENCE TO RELATED APPLICATION

This application is a continuation-in-part of application Ser. No. 574,891, filed Jan. 30, 1984, now abandoned for "Heat Treat Apparatus".

BACKGROUND OF THE INVENTION

This invention is related to apparatus for heat treating metal workpieces in a bed of hot sand, and more particularly to apparatus having means for passing a gas upwardly through the sand to fluidize it during the heat treat process.

Metal workpieces are heat treated in a fluidized bed of heated, finely divided refractory particles, such as sand. A gas or air mixture is passed upwardly through the sand to fluidize the bed. Examples of such a process are disclosed in U.S. Pat. No. 3,197,346, which issued to J. C. Munday, July 27, 1965; U.S. Pat. No. 4,379,725, which issued to Kemp, Apr. 12, 1983; U.S. Pat. No. 4.340,433, which issued to Harding, July 20, 1982; and U.S. Pat. No. 3,298,793, which issued to Mallison et. al., Jan. 17, 1967.

Although fiberglass has been suggested as a means for diffusing the gas, fiberglass tends to break down and fuse at temperatures above 1000° F. Thus, it is unsuited for applications in which the temperature reaches 2500° F.

At temperatures above 500° C. natural gas cracks and soot and carbon tend to foul and plug up conventional metallic based diffusers.

Ceramic tile has also been suggested as a diffusing material. However, at changing temperatures, ceramic tile also cracks, due to thermal or mechanical stress. The cracked tile is ineffective because it changes the gas flow passing through the tile. Ceramic tile is difficult to attach to metal support systems because of different expansion characteristics leading to the appearance of a cracked tile.

SUMMARY OF THE INVENTION

The broad purpose of the present invention is to provide an improved gas diffusing means for circulating a gas through the bed of sand such that the sand is uniformly fluidized.

In one embodiment of the invention, the gas is received in a drum-shaped diffuser tank, having an upper wall formed with a pattern of coined slits. The slits provide a predetermined pressure drop through the diffuser. The slits are formed by coining the metal so that it shears forming a pair of narrow openings in the metal. The gas rises upwardly vertically through the slits to uniformly fluidize the sand.

In another embodiment of the invention, the diffuser includes a lower, flattened metal mesh wall. Ceramic refractory fiber is mounted on the mesh, and an upper flattened metal mesh wall is mounted on the fiber, pressing it to a predetermined density. The gas rises through the fiber to uniformly fluidize the sand.

Ceramic fiber is normally employed as an insulation material. When employed as the principle diffusing material for the gas in which the sand is supported immediately above the fiber, the insulating qualities of the fiber tend to retard gas cracking until after it has passed through the fiber. The products of gas cracking, such as soot and carbon, develop above the fiber, thereby not materially affecting the diffusing characteristics of the fiber.

In addition, the fiber is compressed to provide a predetermined density so as to control the pressure drop of the gas as it passes through the diffuser.

This pressure drop can be adjusted without changing the fluidizing uniformity, in contrast to other systems that can only be changed by decreasing or increasing the quantity and location of the diffuser orifices. The pressure drop of prior art diffusers is usually achieved by reducing the number of orifices since the individual orifice area is of a practical, minimum size. The adjustment is a compromise in the spacing and location of the orifices, thus upsetting the pattern of fluidizing. The pressure drop of the present invention can be adjusted without affecting the fluidizing pattern since the fiber material has a countless number of random passages.

A ceramic fiber diffuser has additional advantages because it is inert to the attack by various gasses used in the heat treat processes, such as nitrogen, anhydrous ammonia, propane, natural gas, water vapor, or air.

A ceramic fiber diffuser is not subject to physical or thermal shock since the material is pliable and resilient over a broad temperature range from the cryogenic termeratures ($-500°$ F.) to heat treating temperatures (2100° F.).

A ceramic fiber diffuser provides valuable insulating qualities for the furnace bottom and increases its overall efficiency by limiting heat losses through the bottom of the furnace.

A ceramic fiber diffuser construction permits control of the pressure characteristics of the fluidizing process that eliminates of fluctuating or vibrating pressures backing up into the gas control equipment.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
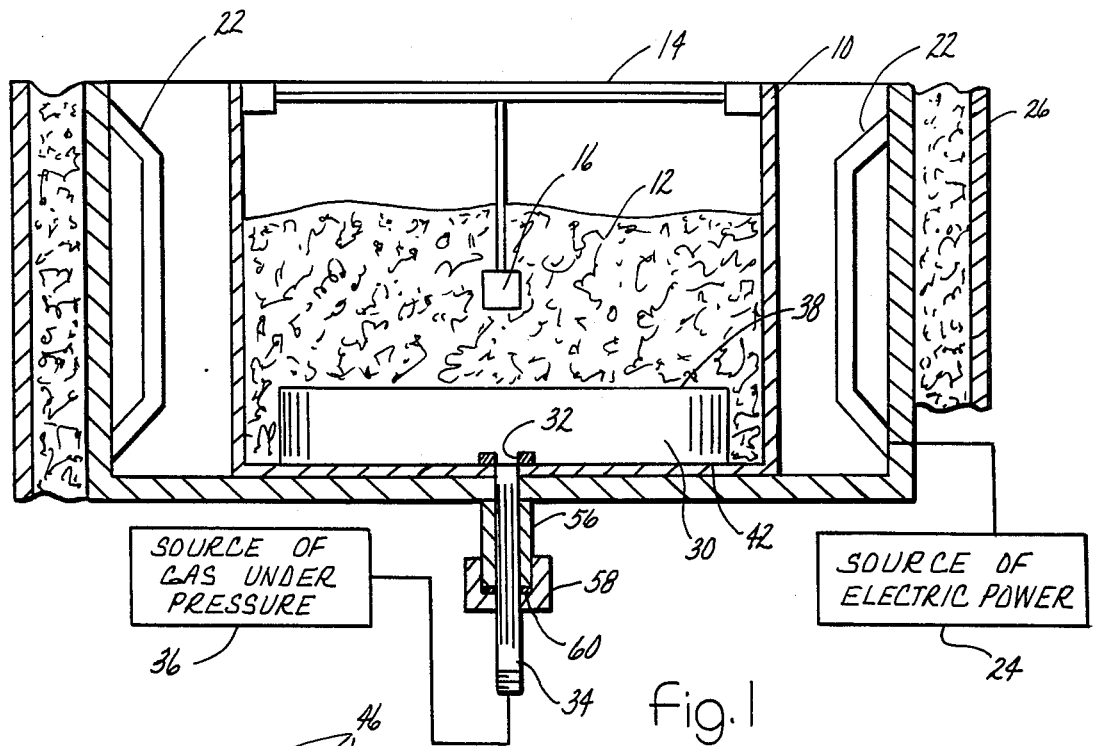
FIG. 1 is a schematic sectional view of a heat treating apparatus with a fluidized bed, illustrating the preferred embodiment of the invention.
Figure 2:
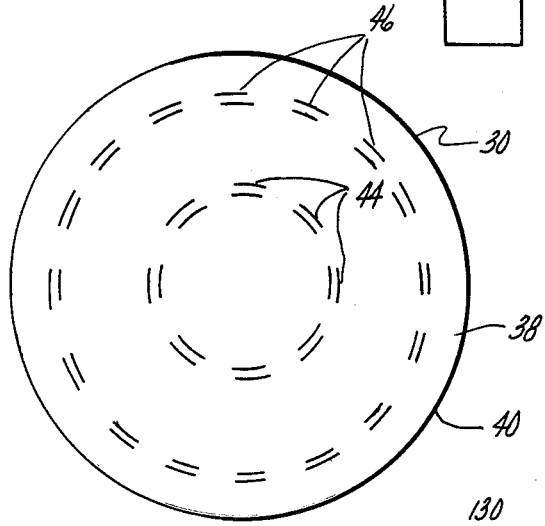
FIG. 2 is a plan view of the diffuser tank.

Referring to the drawings, FIG. 1 illustrates a heat treat housing 10 for a bed 12 of finely divided ceramic particles such as alumina sand. Support 14 provides means for hanging workpiece 16 such that it is buried in the sand.

Electrodes 22, connected to a source of power 24, provide means for heating the bed of sand to a temperature of 2500° F. Insulated shell 26 encloses housing 10.

Diffuser tank 30 is mounted beneath bed 12 and has an inlet opening 32 connected to conduit 34 for receiving gas from source 36. The gas may be any suitable gas, such as nitrogen, perhaps with additives depending upon the nature of the heat treating process.

Tank 30 has a top wall 38 supported in a horizontal position. A cylindrical wall 40 is attached around the edge of top wall 38, and bottom wall 42, attached to side wall 40, defines a plenum chamber for gas being received through conduit 34. Top wall 38 provides a support for the sand and is preferably formed with an inner circular pattern 44 of coined openings as well as an outer circular pattern 46 of coined openings.

Figure 3:
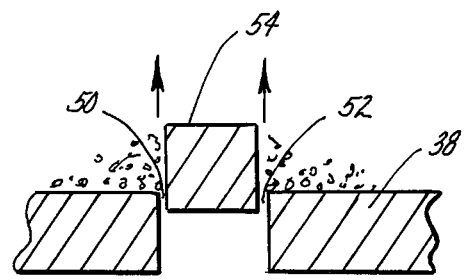
FIG. 3 is an enlarged sectional view of a pair of slits.

Referring to FIG. 3, each opening is formed by bulging the metal from its bottom surface upwardly using a punch until the metal shears to form a pair of slits 50 and 52 on opposite sides of bulge 54. The slits form a passage for the rising gas The gas rises in a direction perpendicular to the top surface of wall 38. The slits are large enough to pass the gas, but smaller than the sand particles so that they do not drop down into the tank. The two patterns 44 and 46 are selected such that the gas rises to uniformly fluidize the sand about workpiece 16 to a consistency similar to quick sand.

The tank and conduit are removably mounted in the bottom wall of the housing. Tube 56 receives conduit 34. Gland nut 58 is threadably mounted on the lower end of tube 56, and packing 60 forms a tight fitting seal between the tube and the conduit. This structure permits the diffuser to be serviced by removing it from the housing without having to wait for the heat treat chamber to cool down.

Referring to FIGS. 4–7, diffuser tank 100 may be used in place of tank 30. Tank 100 removably mounted in the same type of heat treat apparatus to form a support for the bed of sand. Diffuser tank 100 includes a bottom wall 102 having an inlet opening 104 for receiving gas through conduit 106 from source 108. Conduit 106 also is received through tube 48 and receives nut 50 and packing 52 to form a gas-tight seal.

A cylindrical sidewall 110 is attached around the edge of bottom wall 102.

A small ring 112 is mounted adjacent opening 104, and a larger ring 114 is mounted on wall 102 adjacent sidewall 110. Distribution grid 116 is mounted on rings 112 and 114. The distribution grid, best illustrated in FIG. 7, comprises a plurality of regularly spaced, radial legs 118 mounted on top of the two rings.

A lower, alloy metal, porous diamond mesh flattened expanded metal member 120 is mounted on the distribution grid. The flattened metal member is a disk shaped member having a diameter slightly less than the inside diameter of sidewall 110.

Figure 4:
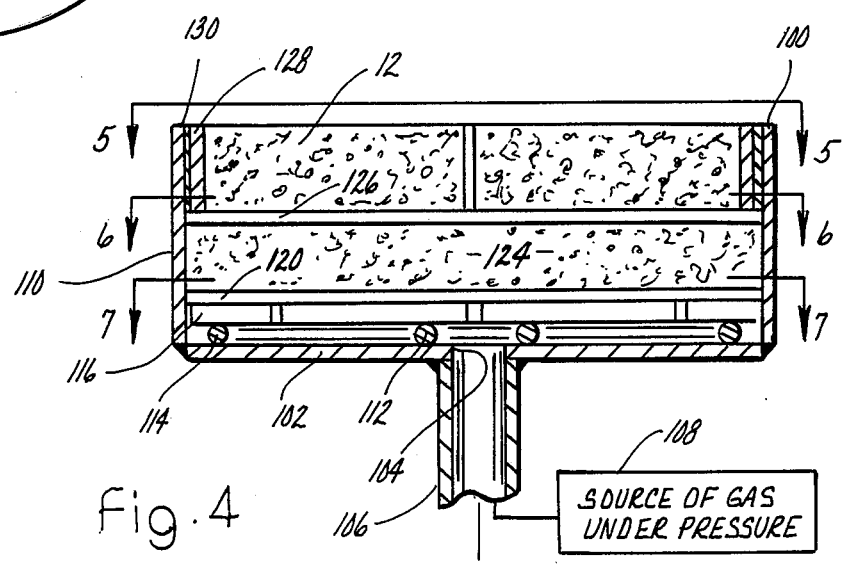
FIG. 4 illustrates another form of the invention employing ceramic fiber for diffusing the gas.
Figure 5:
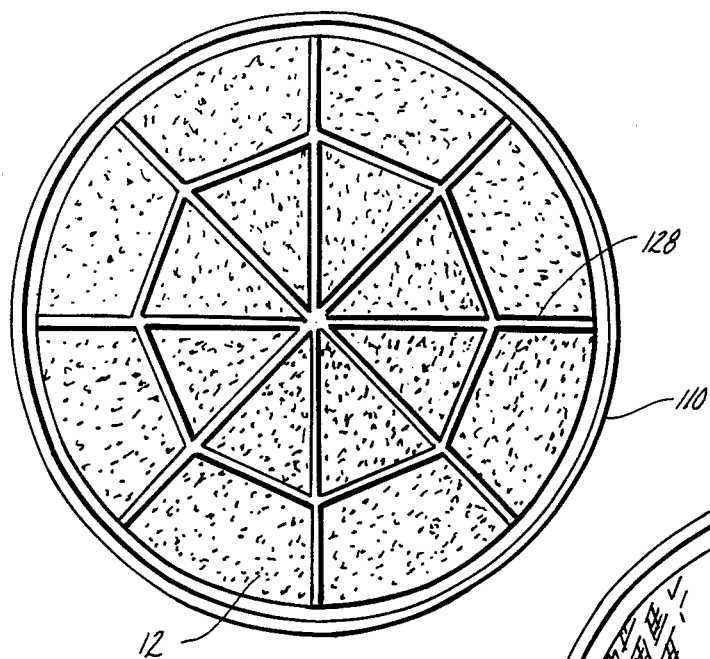
FIG. 5 is a view seen along lines 5—5 of FIG. 4.

Referring to FIG. 4, a densely packed mass of a resilient ceramic refractory fiber 124 is disposed on flattened expanded metal member 120. The fiber is compressed to a density to provide a predetermined pressure drop through the fiber and to cover the entire surface of the flattened expanded metal member between the opposite sides of sidewall 110. Such a fiber may be the high temperature product marketed under the name PYROBLOC HT(H) by Pyro Bloc Division of Sauder Industries.

Figure 6:
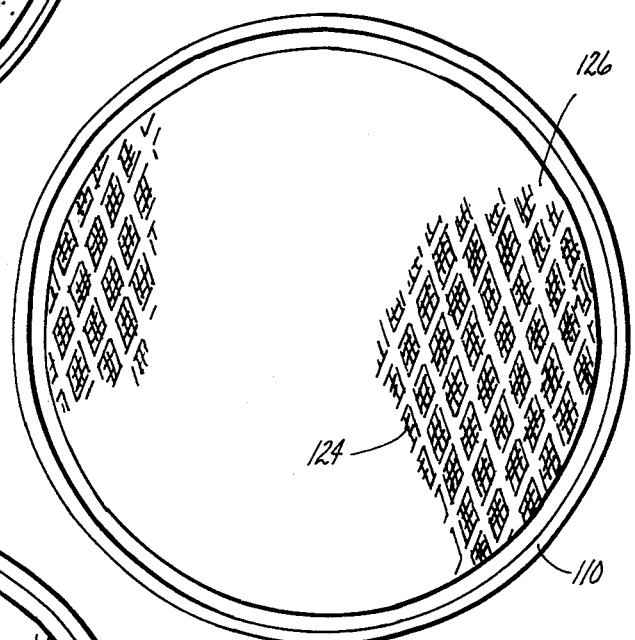
FIG. 6 is a view as seen along lines 6—6 of FIG. 4.
Figure 7:
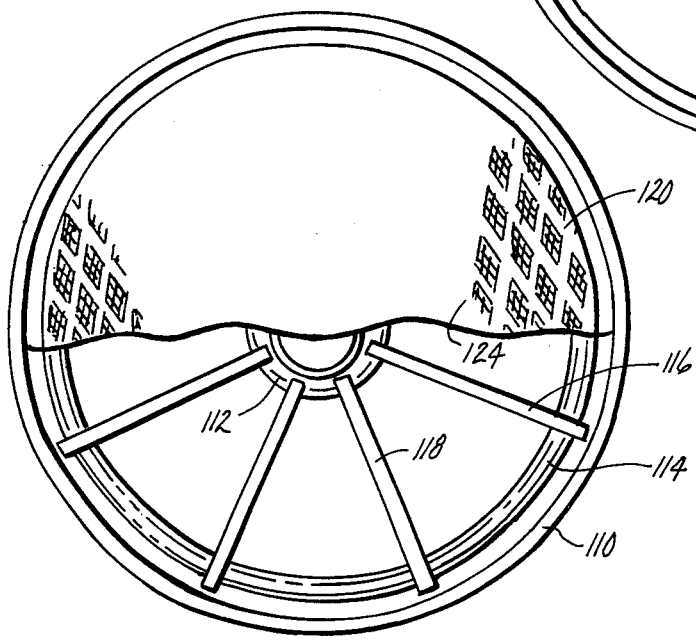
FIG. 7 is a fragmentary view as seen along lines 7—7 of FIG. 4.

Referring to FIG. 6, an upper diamond mesh flattened metal member 126 is mounted on the fiber to maintain it in its compressed state of a predetermined density. An open grid structure 128 is mounted above the grid and occupies the space between the grid and the top edge 130 of sidewall 110. Grid 128 is tack welded to the sidewall, but can be separated from the sidewall to permit fiber 124 to be replaced or to change the degree of compression of the fiber, thereby influencing its density.

In use, the diffuser tank is disposed in the housing to form a support for the bed of sand. The sand fills the tank above flattened metal mesh member 126. The gas from source 108 rises through conduit 106 into the plenum chamber defined by the distributor grid. It then rises through diamond mesh member 120, where it is then uniformly distributed by the ceramic fiber before it rises to fluidize the bed of sand. Any products of gas cracking are deposited above fiber 124 so that they do not plug the fiber and change gas flow.

Having described my invention, I claim:

1. Apparatus for heat treating an article, comprising:
   means forming a heat treat chamber having a bed of finely divided particles;
   means for heating the finely divided particles;
   means for fluidizing the finely divided particles comprising;
   a diffuser tank removably mounted in said heat treat chamber to form a gas chamber beneath the bed of particles, said diffuser tank having an inlet for receiving a gas, and a top planar diffuser wall forming a base for the finely divided particles and defining the top of the gas chamber, the top wall a plurality of slits, each slit being fromed adjacent a bulge in the wall formed perpendicular to the plane of the wall, each slit being sufficiently large enough to pass the gas upwardly in a direction generally perpendicular to the plane of the diffuser top wall into the bed of particles, each slit being small enough to prevent the downward passage of said particles into the gas chamber; and
   a source of gas and means for delivering the gas to the tank so that the gas rises through the slits in the diffuser top wall to fluidize the finely divided particles.

2. 2. A removable diffuser for heat treating apparatus, comprising:
   a tank defining a gas chamber, and having an inlet for receiving a gas, and a planar top diffuser wall forming a base for a bed of finely divided particles, the top diffuser wall having a pattern of slits for the passage of the gas, each slit being disposed adjacent a bulge in the wall formed perpendicular to the plane of the wall, and defining an opening sufficiently large to pass the gas from the gas chamber into the bed of particles in a direction generally perpendicular to the diffuser wall, but small enough to prevent the particles from passing through the slits into the gas chamber.

3. Apparatus for heat treating an article, comprising:
   means forming a heat treat chamber having a bed of finely divided particles;
   means for heating the finely divided particles;
   means for fluidizing the finely divided particles comprising;
   a diffuser tank having an open top and a bottom wall with a gas inlet, and side walls connected to the bottom wall;
   a porous distributor means, and means on the bottom wall supporting the distributor means a predetermined height above the bottom wall to define a gas chamber;
   resilient refractory ceramic fiber disposed on the distributor means such that gas passing through the distributor means is received through the ceramic fiber; and a mesh wall disposed above the fiber and engaging the fiber to maintain it in in a predetermined compressed condition such that it uniformly disperses the gas as it rises from the distributor means through the open top of the tank.

4. Apparatus as defined in claim 3, in which the diffuser tank is adapted to be mounted in a heat treat chamber, and including said finely divided particles being disposed on the mesh wall immediately above the ceramic fiber.

5. Apparatus as defined in claim 3, in which the ceramic fiber has insulation properties so as to delay cracking of the gas whereby the products of cracking do not form until the gas has passed through the fiber.

6. Apparatus as defined in claim 3, in which the gas flow pressure drop through the fiber is controlled by adjusting the density of the ceramic fiber.

* * * * *